Figure 1:
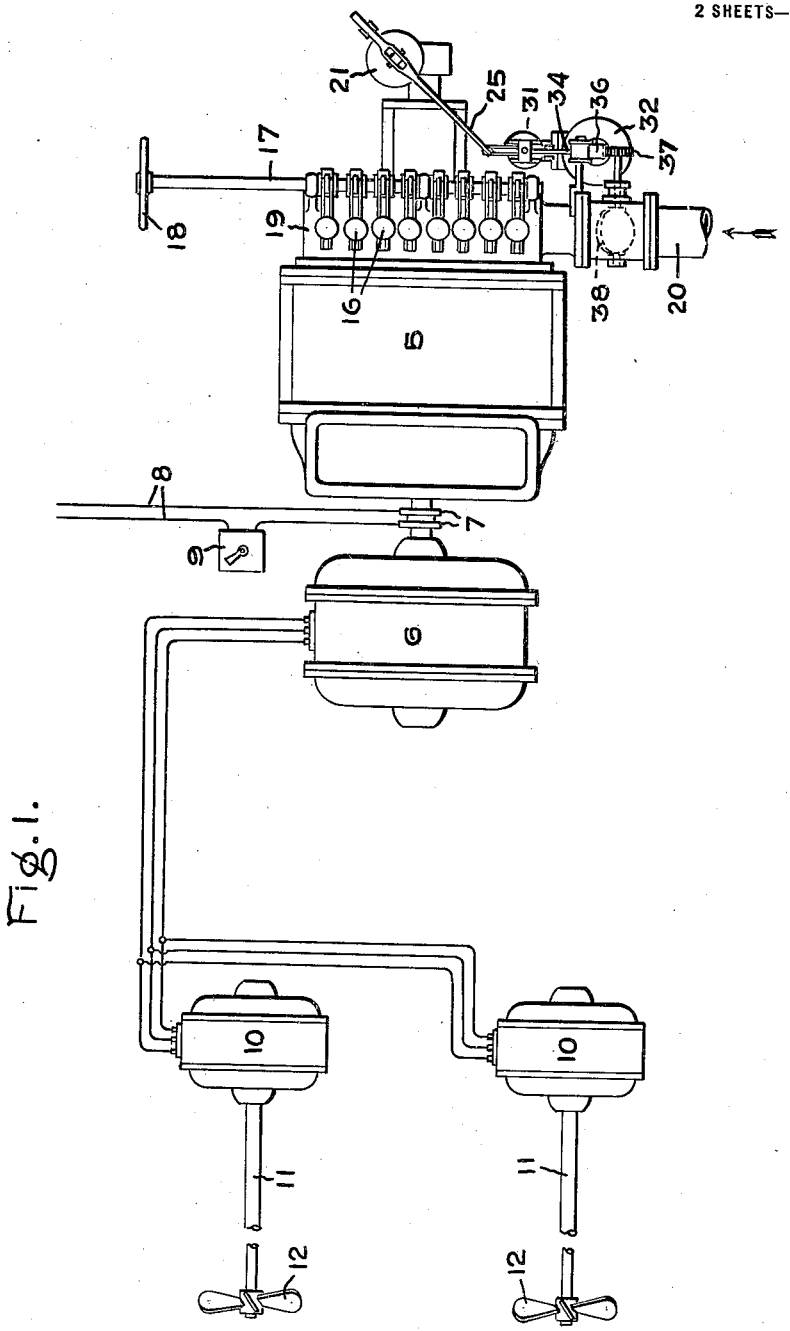

W. L. R. EMMET.
SYSTEM OF SHIP PROPULSION.
APPLICATION FILED SEPT. 17, 1912.

1,137,593.

Patented Apr. 27, 1915.
2 SHEETS—SHEET 1.

Witnesses:
Marcus L. Byng.
J. Ellis Glen

Inventor:
William L.R. Emmet,
by
His Attorney.

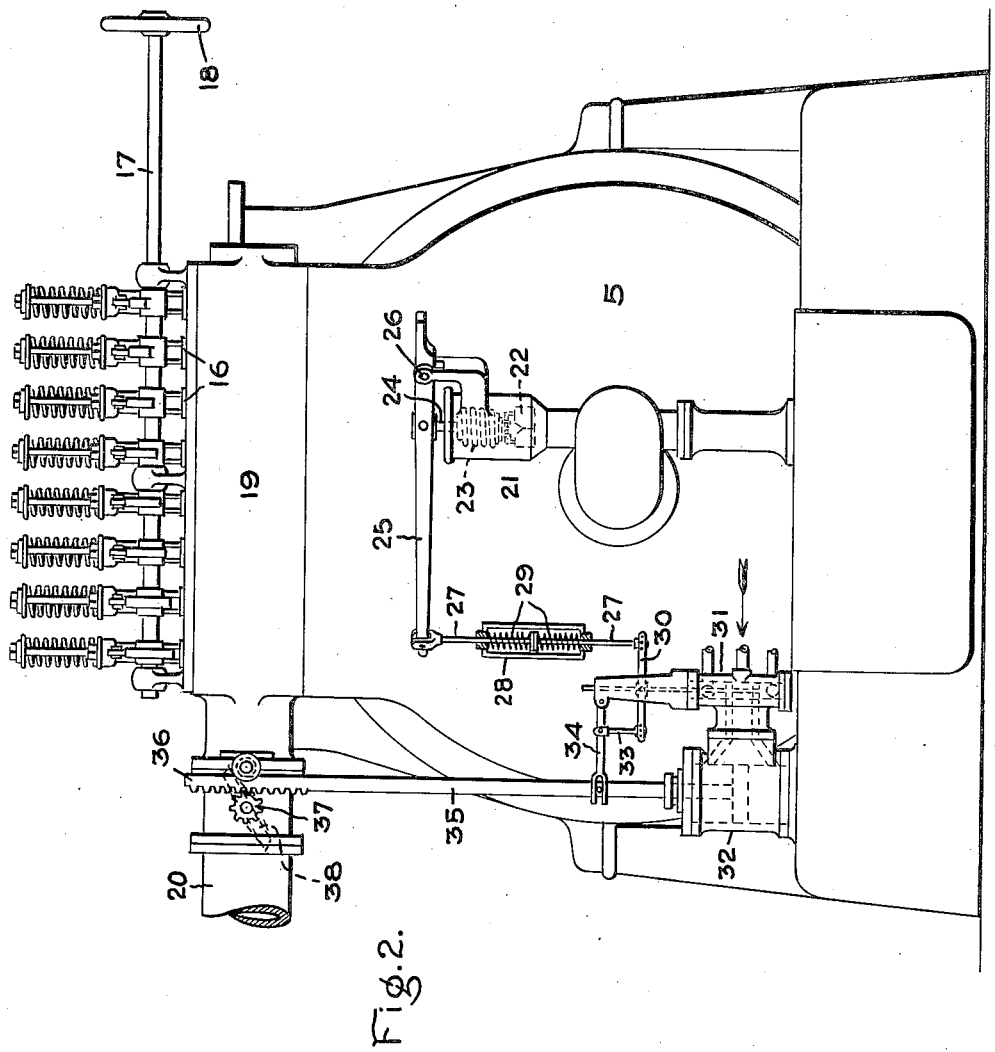

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

SYSTEM OF SHIP PROPULSION.

1,137,593.

Specification of Letters Patent.   Patented Apr. 27, 1915.

Application filed September 17, 1912. Serial No. 720,763.

*To all whom it may concern:*

Be it known that I, WILLIAM L. R. EMMET, a citizen of the United States, residing at Schenectady, county of Schenectady, State of New York, have invented certain new and useful Improvements in Systems of Ship Propulsion, of which the following is a specification.

My invention relates to systems of ship propulsion in which the propeller shafts are rotated by electric motors receiving current from generators driven by elastic fluid turbines.

The objects of my invention are to provide in a ship propulsion system of the type above described a novel combination and arrangement of apparatus for obtaining a more satisfactory and efficient speed control than has heretofore been possible in a system of this character.

In propelling ships, particularly those of larger size, by electric motors, it is desirable to use alternating currents since the motors and generators for alternating currents are simpler than those for direct currents, the generators can be conveniently designed for larger capacities and higher speeds, and therefore are better adapted for use with steam turbines. Alternating current motors of the simplest type require no commutators and can be constructed and wound in such a manner that they will stand the roughest usage with a minimum of trouble and expense for maintenance. Such alternating current motors, however, are best adapted to operation at speeds synchronous or nearly synchronous with the speed of the generator, and therefore where such motors are used it is desirable to change the speed of the vessel by changing the speed of the generator. When a steam turbine is used as the prime mover of such a system, the speed of the generator and motor can be varied by simply changing the steam admission to the turbine, the resistance of the propeller balancing the force of the steam and the electrical apparatus establishing a fixed ratio between the turbine speed and that of the propeller. Such method of control would be adequate for handling a vessel, were it not for the fact that it is desirable to interrupt the electric circuit for purposes of changing connections for reversing or for changing the arrangements of windings to give different ratios of speed reduction. In the event of such interruptions the load is removed from the prime mover and it will immediately acquire an excessive speed unless a means is provided for limiting it. Previous to my present invention, such speed increase of a generator has been limited by an emergency trip which served to shut off the steam entirely when some predetermined speed limit of the generator had been reached. Such an arrangement is objectionable, since it cuts off entirely the supply of steam to the turbine, and consequently the latter must be started anew when it is desired to close the electric circuit.

According to my invention, I provide a hand-operated valve or valves for controlling the quantity of elastic fluid admitted to the turbine. In this manner I control the speed of the turbo-generator unit and in consequence thereof the speed of the propeller driving motors.

I further provide a speed responsive device which is adapted to shut off the supply of elastic fluid to the turbine when the turbine speed exceeds a certain predetermined limit, which limit is slightly in excess of the maximum speed employed in operating the vessel. This device does not, however, shut off the elastic fluid by tripping an emergency valve, but on the other hand it causes an admission valve, located preferably in the main supply pipe, to close in such a manner that it will immediately and automatically open again as soon as the turbine speed has fallen below the predetermined limit. With this arrangement, if the load is suddenly removed from the system, as when the electric circuit of the motors is interrupted, the turbine speed will rise to the limit above mentioned, and the latter admission valve will automatically close to an extent sufficient to prevent excessive speed. At this point, the turbine will operate without load, and at such a speed that it is ready for doing work whenever the electric circuits are closed again.

In the preferred embodiment of my invention, I employ, as described above, two separate systems of valves. One system of valves is controlled by hand and limits the quantity of elastic fluid admitted to the turbine, thereby controlling the speed of the latter. The other valve system consists preferably of a throttle valve located in the main supply pipe. This valve is controlled by a speed-responsive device connected to the shaft of the turbine and operates merely to limit the maximum speed at which the turbine will run. The same result can obviously be accomplished by the use of the same system of valves for hand control of the turbine speed and for limiting the maximum turbine speed. In the latter event the speed-responsive device is so arranged that it cannot open the system of valves beyond the point fixed by the hand-control mechanism, but is free to close such valves if the maximum speed limit is exceeded, no matter what position the hand-control mechanism occupies.

The novel features which I believe to be characteristic of my invention will be definitely indicated in the claims appended hereto. The features of construction and mode of operation will be understood by reference to the following description taken in connection with the accompanying drawings which show the preferred embodiments of my invention, and in which:—

Figure 1 is a diagrammatic view of a ship propulsion system involving the novel features of my invention, and Fig. 2 is an end elevation of the turbine of such a system, showing the hand-operated valves and the speed-responsive device.

Referring to Fig. 1, I have shown a steam turbine 5 and directly coupled to the revolving shaft thereof an alternating current generator 6, having slip rings 7 for conducting the exciting current from and external source of supply 8 to the field of the generator. A rheostat 9 is included in this field circuit for regulation of the exciting current. The alternator supplies current to electric motors 10, the revolving shafts of which are directly connected through propeller shafts 11 to propellers 12.

The turbine is provided with a compound admission valve comprising a series of valves 16, which are controlled by a cam shaft 17 and a hand-operated wheel 18, and which serve to admit elastic fluid, such for example, as steam, from the chest 19 through suitable nozzles or passages to the rotor of the turbine. The cams are arranged to open the valves in successive order and to similarly close them. Steam is admitted through the conduit or supply main 20 into the chest 19. A speed-responsive device 21 is operatively connected to the revolving shaft of the turbine in any well known manner. This device as shown in the drawings is of the centrifugal type and comprises the weights 22, spring 23 and rod 24. The rod 24 is connected to a lever arm 25, one end of which is fulcrumed at a point 26 on an extension of the casing of the device 21.

The other end of the lever 25 is connected to a rod 27 which is constructed in two parts flexibly connected by means of a sliding yoke 28 and the springs 29. The rod 27 is connected to one end of a floating lever 30, pivoted at its middle point to the stem of the pilot valve 31 of a fluid pressure motor 32. The floating lever 30 is connected, by means of a link 33 and pivoted lever 34, to the piston rod 35 of the fluid pressure motor. The piston rod is provided with a rack 36 at its upper end which coöperates with a pinion 37 rigidly secured to the spindle of a throttle valve 38 located in the supply main 20.

The operation of my novel and improved system is as follows:—The speed responsive device is adjusted to operate the throttle valve only when the speed of the turbine reaches a certain predetermined maximum limit which is ordinarily slightly in excess of the maximum speed attained during the normal operation of the ship. When the speed of the turbine is below this limit, the speed responsive device will in no way affect the operation of the turbine. When the speed of the turbine exceeds this maximum value for which the speed responsive device is adjusted, the weights 22 will move outwardly and the pilot valve will be lowered through the coöperation of the lever 25, the rod 27 and the floating lever 30. Fluid under pressure is thereby admitted below the piston of the motor 32, and the piston rod 35 moves upwardly and tends to close the throttle valve 38. The follow-up device comprising the lever 34 and link 33 is actuated by the piston rod and restores the pilot valve to its midposition, and the motor 32 comes to rest in its new position. This operation will be repeated if necessary until the valve has been closed sufficiently to prevent the speed of the turbine exceeding the desired limit. The rod 27 is flexibly constructed in order to prevent objectionable strains on the mechanism in case the piston rod 35 is, through lack of actuating fluid pressure, or for any other reason, not free to follow the movement of the governor and the lever 25.

A variable speed of the propeller driving motors 10 is obtained by adjusting the hand-operated compound valve by means of the wheel 18. If the electric circuit is interrupted and the load is thus suddenly taken off of the generator 6, the turbine will tend to speed up. The speed responsive device will prevent, under these circumstances, the speed of the turbine rising above the predetermined limit, which limit, as previously mentioned, is slightly in excess of the speed of the turbine at the maximum speed employed in the navigation of the ship. If now the electric circuit is closed and the load is thus suddenly thrown on the generator 6, the turbine will be running and in a condition for doing work. The advantage of this arrangement is that it provides an automatic means by which excessive or dangerous speeds are avoided but one which also holds the generating unit in operation and at a speed in readiness for instant use when the electric circuits are reëstablished. This greatly facilitates changes of electrical conditions for reversal or changes of speed, since it makes possible the interruption and reëstablishment of the circuits without any attention being given to the prime mover, and at the same time does not interfere with the variation of the speed by control of the steam admission at ranges below the predetermined speed limit.

Although I have shown as the speed responsive device a standard centrifugal speed governor of ordinary construction, it is evident that I am using this device for a purpose entirely different from that to which speed governors are ordinarily applied. In the normal uses of my improved system, this speed responsive device will be entirely out of effective action, the speeds under such conditions being below the range at which the device is designed to operate. The function of the device is to limit the speed of the turbine at times when the electric load is removed, and to hold the turbine in readiness to again do its normal work when the electric load is reëstablished. The speed responsive device thus limits the turbine speed, in that it prevents the speed of the turbine rising above a predetermined value. When the turbine speed rises to this predetermined value, as for example, when the load is removed from the turbo-alternator unit, the speed responsive device acts in the nature of a governor with respect to this particular speed, in that it maintains the turbine in an operative running condition at approximately this predetermined speed. The turbine continues to run without load at this predetermined speed, and under this condition the speed responsive device operates to maintain this predetermined speed of the turbine, but as soon as the load is again thrown on the turbo-alternator unit, the turbine speed falls to its normal operating speed as determined by the position of the hand operated valves 16, but the speed responsive device now has no further action than to hold open the valve 38. Without such a speed-responsive device as I have shown, it is necessary to make all changes of electrical connections under load, or else to cut off the steam supply entirely and start the turbine afresh after making the change of connections. The change of connections under load involves a variety of difficulties, not only through the switching of large currents, but through the momentary interruption of load which allows the turbine to increase its speed. With the speed responsive device herein described, changes of connections can be made at no load and without stopping the turbine.

The system of propulsion which I have described is ideally simple with respect to the electrical arrangements, no electric means for speed control being required, and no changes of electric circuits being necessary except changes from one cycle of operation to another, such as a change from go-ahead conditions to reversing conditions. The speed of the ship is varied at will by changing the quantity of steam admitted to the turbine by means of the hand-operated valves. The speed responsive device is incapable of increasing the quantity of steam admitted beyond the limits established by the hand-operated valves, but is capable of restricting at any time, when the speed of the turbine exceeds the predetermined limit, the admission of steam. The governor therefore acts to establish the limit of speed, and the hand-operated valves act under normal operating conditions to limit the quantity of steam admission.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A ship propulsion system comprising in combination, an elastic fluid turbine, an alternator coupled to said turbine, a propeller driving motor electrically connected to said alternator, and means for varying the speed of the ship within the range of speeds normally employed in the navigation of the ship by varying the speed of said turbine and for holding said turbine in an operating condition at an approximately constant predetermined speed when the load is removed from the turbine.

2. A ship propulsion system comprising in combination, an elastic fluid turbine, an alternator coupled to said turbine, a propeller driving motor electrically connected to said alternator, and means for varying the speed of the ship by varying the admission of elastic fluid to said turbine and for maintaining said turbine when the load is removed therefrom in an operative running condition at a speed slightly in excess of the maximum speed employed in the normal navigation of the ship.

3. A ship propulsion system comprising in combination, an elastic fluid turbine, an alternator coupled to said turbine, a propeller driving motor electrically connected to said alternator, a speed responsive device adapted when the speed of the turbine slightly exceeds the maximum operating speed normally employed in the navigation of the ship to maintain said turbine in an operating condition and to limit its speed, and means independent of said speed responsive device for varying the speed of said turbine to vary the speed of the ship.

4. A ship propulsion system comprising in combination, an elastic fluid turbine, an alternator coupled to said turbine, a propeller driving motor electrically connected to said alternator, a speed responsive device in operative relation to said turbine for maintaining a no-load speed of the turbine, and means independent of said speed responsive device for controlling the speed of said turbine for obtaining the speeds required in the normal navigation of the ship.

5. A ship propulsion system comprising in combination, an elastic fluid turbine, an alternator coupled to said turbine, a propeller driving motor electrically connected to said alternator, means for varying the speed of said turbine through the range necessary to obtain the desired speeds employed in the navigation of the ship and for maintaining said turbine in an operative running condition when the load is removed therefrom.

6. A ship propulsion system comprising in combination, an elastic fluid turbine, an alternator coupled to said turbine, a propeller driving motor electrically connected to said alternator, means for controlling the admission of elastic fluid to said turbine to obtain the speeds required in the navigation of the ship, and a speed responsive device inactive during normal operating speeds of the turbine but adapted at no-load to maintain said turbine in an operative running condition and at a speed slightly in excess of its normal maximum operating speed.

7. A ship propulsion system comprising in combination, an elastic fluid turbine, an alternator coupled to said turbine, a propeller driving motor electrically connected to said alternator, means for controlling the amount of elastic fluid admitted to said turbine to obtain the speeds required in the navigation of the ship, and a speed responsive device inactive during normal operating speeds of the turbine but adapted to act as a speed governor to approximately maintain a predetermined turbine speed when the speed of the turbine attains such predetermined value.

8. A ship propulsion system comprising in combination, an elastic fluid turbine, an alternator coupled to said turbine, a propeller driving motor electrically connected to said alternator, a conduit for supplying elastic fluid to said turbine, manually operable means for varying the quantity of elastic fluid admitted to said turbine thereby varying the speed of the turbine and accordingly the speed of the propeller driving motor, a throttle valve in said conduit, and a speed responsive device operatively related to said turbine and coöperating with said throttle valve and adapted to limit the speed of the turbine when the turbine speed slightly exceeds the maximum operating speed normally employed in the navigation of the ship and to maintain said turbine in an operative running condition.

9. A ship propulsion system comprising in combination, an elastic fluid turbine, an alternator coupled to said turbine, a propeller driving motor electrically connected to said alternator, means for adjusting the amount of elastic fluid admitted to said turbine to obtain the speeds required in the navigation of the ship and for maintaining said turbine in an operative running condition when the load of said propeller driving motor is removed from said alternator.

10. A ship propulsion system comprising in combination, an elastic fluid turbine, an alternator coupled to said turbine, a propeller driving motor electrically connected to said alternator, and means for controlling the amount of elastic fluid admitted to said turbine to vary the speed of the turbine for obtaining the turbine speeds required in the navigation of the ship and for maintaining an approximately constant turbine speed when the load of said propeller driving motor is removed from said alternator.

11. A ship propulsion system comprising in combination an elastic fluid turbine, an alternator coupled to said turbine, a propeller driving motor electrically connected to said alternator, a conduit for supplying elastic fluid to said turbine, a throttle valve in said conduit, a speed responsive device for partially closing said throttle valve when the speed of the turbine attains a predetermined maximum value, an additional valve for controlling the admission of elastic fluid to said turbine, and means for operating said additional valve.

12. A ship propulsion system comprising in combination an elastic fluid turbine, an alternator coupled to said turbine, a propeller driving motor electrically connected to said alternator, a valve for controlling the admission of elastic fluid to said turbine, means for operating said valve, a conduit for supplying elastic fluid to said turbine, a valve normally inactive in said conduit, and a speed responsive device for operating said conduit valve and for maintaining said turbine in an operating condition when the speed of the turbine attains a predetermined maximum value.

In witness whereof, I have hereunto set my hand this 16th day of September, 1912.

WILLIAM L. R. EMMET.

Witnesses:
BENJAMIN B. HULL,
HELEN ORFORD.